(12) United States Patent
Jensvold

(10) Patent No.: US 7,517,388 B2
(45) Date of Patent: Apr. 14, 2009

(54) AIR SEPARATION MEMBRANE MODULE WITH VARIABLE SWEEP STREAM

(75) Inventor: John A. Jensvold, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 523 days.

(21) Appl. No.: 11/383,301

(22) Filed: May 15, 2006

(65) Prior Publication Data

US 2007/0261554 A1    Nov. 15, 2007

(51) Int. Cl.
*B01D 53/22* (2006.01)
(52) U.S. Cl. .................. 95/45; 95/52; 95/54; 95/12; 95/23; 96/8; 96/10; 55/419; 210/321.8; 210/321.89; 210/500.23
(58) Field of Classification Search .......... 96/4, 96/8, 10; 95/45, 47, 52, 54, 12, 23; 210/321.8, 210/321.89, 500.23, 640; 55/419
See application file for complete search history.

(56) References Cited

U.S. PATENT DOCUMENTS

| | | | |
|---|---|---|---|
| 4,508,548 A | 4/1985 | Manatt | |
| 4,834,779 A | 5/1989 | Paganessi | |
| 5,240,612 A * | 8/1993 | Grangeon et al. | 95/46 |
| 5,525,144 A | 6/1996 | Gollan | |
| 6,070,339 A * | 6/2000 | Cunkelman | 96/4 |
| 6,136,073 A * | 10/2000 | Coan et al. | 96/8 |
| 6,616,735 B1 * | 9/2003 | Burban et al. | 96/8 |
| 6,755,894 B2 | 6/2004 | Bikson | |
| 7,153,341 B2 * | 12/2006 | Hoyt et al. | 96/8 |
| 2005/0110172 A1 | 5/2005 | Tanaka | |
| 2005/0211097 A1 | 9/2005 | Eckman | |
| 2008/0060517 A1 * | 3/2008 | Nichols | 96/8 |

FOREIGN PATENT DOCUMENTS

| | | |
|---|---|---|
| GB | 2228427 A | 8/1990 |
| JP | 2-135117 | 5/1990 |

OTHER PUBLICATIONS

Burns et al, Flight-Testing of the FAA Onboard Inert Gas Generation System on an Airbus A320,Federal Aviation Administration (DOT/FAA/AR-03/58), Jun. 2004.

* cited by examiner

*Primary Examiner*—Jason M Greene
(74) *Attorney, Agent, or Firm*—William H. Eilberg

(57) ABSTRACT

A gas-separation module allows a sweep gas to be introduced at selectively variable locations, and in selectively varying amounts, along the length of the module. The sweep gas enters the module through a perforated conduit. A slotted sleeve, disposed within the conduit, selectively blocks and unblocks perforations in the conduit. Rotation of the sleeve causes slots to come into, or out of, registration with the perforations. The sleeve permits varying amounts of sweep gas to be introduced at different locations along the length of the module. Rotation of the sleeve changes the profile of introduction of sweep gas, and can be used to optimize the performance of the module for each of a set of different pressure conditions.

14 Claims, 2 Drawing Sheets

AIR SEPARATION MEMBRANE MODULE WITH VARIABLE SWEEP STREAM

BACKGROUND OF THE INVENTION

The present invention relates to the field of non-cryogenic separation of gases, such as air, into components.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane at elevated pressure.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

The effectiveness of a membrane in gas separation depends not only on the inherent selectivity of the membrane, but also on its capability of handling a sufficiently large product flow. Gas permeates through the membrane due to the pressure differential between one side of the membrane and the other. Thus, to maintain the pressure differential, it is advantageous to remove the permeate gas from the vicinity of the fibers, after such gas has emerged on the shell side. Removal of the permeate gas maximizes the partial pressure difference across the membrane, with respect to the permeate gas, along the length of the module, thus improving both the productivity and recovery of the module. In the membrane module of the present invention, the permeate gas is made to flow out of the module in a direction opposite to that of the basic feed stream.

The removal of the permeate gas is typically accomplished with a "sweep" stream, i.e. a stream of gas which carries the permeate gas out of the module. The sweep gas may also dilute the permeate gas, reducing its partial pressure, and further assisting in the removal of permeate gas from the module.

U.S. Pat. Nos. 4,834,779 and 6,755,894, the disclosures of which are incorporated by reference herein, provide examples of the use of sweep streams.

Conventional gas-separation modules are designed to create a simple counter-current flow pattern between the high pressure retentate gas flowing through the bores of the hollow fiber membranes and the low pressure permeate flowing on the outside of the fibers. That is, the permeate which has passed through the membrane is made to flow in the opposite direction of the feed gas flowing through the bores of the fibers. A sweep stream typically aids this counter-current flow.

The following practical considerations may prevent optimum performance of a gas-separation membrane module.

When the module described above is used to separate air into nitrogen-rich and oxygen-rich streams, the nitrogen concentration of the high-pressure gas inside the fiber steadily increases as that gas flows along the length of the fiber, because oxygen is preferentially permeated through the wall of the fiber membrane. The amount of oxygen removed from the high-pressure stream depends on the intrinsic characteristics of the fiber, i.e. its oxygen and nitrogen permeability, as well as on the difference between the partial pressure of oxygen on the pressurized feed side of the membrane and the partial pressure of the oxygen on the low-pressure shell side of the membrane. In general, this partial pressure differential changes along the length of the module.

In a typical module, more oxygen is permeated near the feed end of the module, because, as the pressurized gas passes along the length of the module, the partial pressure of oxygen decreases in the retentate stream. The result is a concentration gradient on the shell side of the module as well. The oxygen concentration is highest on the shell side near the feed end of the module, and lowest near the outlet end.

The counter-current design of conventional modules is intended to minimize this shell side oxygen concentration gradient. Gas permeated near the outlet end of the module, which has lower oxygen content, acts as a sweep for the feed end of the module that is permeating oxygen at a higher concentration. This arrangement tends to maximize the partial pressure differential along the full length of the module, and helps to maintain the flow of oxygen through the membrane throughout the module.

Notwithstanding this counter-current flow pattern, there will still be regions of the shell side in which the oxygen level will exceed 21%, the percentage in ambient air. When operating to give low purity nitrogen (of the order of less than 95% purity), often the entire length of the shell side of the module has an oxygen concentration of greater than 21%. The latter is due to the fact that there is more oxygen remaining in the retentate stream, near the outlet end, so there is more permeation of oxygen at the outlet end. When the purity of the nitrogen increases, however, the shell-side oxygen concentration at the outlet end is reduced, due to the fact that most of the oxygen has permeated through the membrane, and there is less oxygen remaining on both sides of the membrane. In this situation, the sweep gas is useful only near the feed end of the module.

In general, for those regions where the shell-side oxygen concentration is above 21%, a low-pressure air sweep, formed of ambient air, can be added to increase further the partial pressure differential, and thus to increase the permeate flow.

The above considerations show that, to optimize the operation of the module, the position and flow of the sweep stream could be adjusted according to the concentrations of oxygen and nitrogen in the various streams, at various positions along the length of the module. In many cases, however, the advantage that might be obtained by adjusting the sweep stream would not justify the effort.

However, one application which benefits greatly from careful control of the sweep stream is in the field of aviation. Specifically, membrane-based modules can be used to produce oxygen-depleted gas for inerting of the fuel tanks of an aircraft. The oxygen-depleted gas is conveyed into the unoccupied head space of a fuel tank, to reduce or eliminate the risk of explosion.

In an aircraft, not only are all the considerations discussed above applicable, but the aircraft experiences major changes in external pressure, due to changes of altitude, for which the inerting system must compensate. The application wherein the fuel tanks of aircraft are inerted is known in the industry as OBIGGS, i.e. on-board generation of inert gas for fuel tank inerting.

In the above application, the feed pressure and feed to product pressure ratio are fairly low, and the acceptable level of oxygen in the inert gas stream is fairly high, up to about 12%. These factors work to make the net oxygen partial pressure across the membrane highly dependent on the oxygen concentration on the shell side. Also, the module must operate at different pressures and product purities, to insure that the fuel tank oxygen levels remain below 12%, during take-off, climb, cruise, descent, and landing. The module operates with feed air taken from the bleed air system of the aircraft, and the pressure of this air therefore changes with altitude. The shell-side pressure also changes with altitude since the permeate flow exits the module at ambient pressure. The nitrogen purity requirements also change during the course of the flight, with lower purity needed during the climb and descent portions of the flight, and higher purity required while cruising at altitude. Because of these different requirements, a module with air sweep capabilities must be able to change the position of the sweep along the length of the module during the flight.

For times when low purity nitrogen (i.e. gas having about 12% oxygen) is required, the invention allows for the entire length of the module to be air swept. When higher purity nitrogen is desired (i.e. gas having about 2% oxygen), then the invention allows for only the feed end of the module to be swept, since providing an air sweep along the entire length of the module would hinder its performance.

SUMMARY OF THE INVENTION

The present invention comprises a gas-separation module in which the amount of sweep gas introduced varies along the length of the module, and in which the sweep gas profile can be adjusted.

The sweep gas is preferably introduced through a perforated conduit located at or near the longitudinal axis of the module. A slotted sleeve is inserted within the conduit. Slots in the sleeve block or unblock perforations in the conduit, thus allowing sweep gas to flow through only selected perforations. In particular, when a slot is in registration with a perforation, sweep gas can flow from the interior of the sleeve, through the perforation, and into the shell side of the module. When no slot is in registration with a perforation, no sweep gas can flow through that perforation.

The sleeve preferably has a plurality of sets of slots, disposed along the length of the sleeve. There are more slots in the sets closer to the inlet end of the module, and fewer slots in the sets closer to the outlet end. Thus, in general, more sweep gas is likely to be provided near the inlet end than near the outlet end.

The sleeve is rotatable within the conduit, so as to vary the profile according to which sweep gas is introduced along the length of the module. In one extreme angular position, the sleeve may permit sweep gas to be introduced only near the inlet end, or not at all. In the opposite extreme angular position, the sleeve could permit sweep gas to be introduced along the entire length of the module. The angular position of the sleeve may be rotated when conditions require, such as for a change in altitude, when the apparatus is used on an aircraft.

The invention also includes the method of operating the gas-separation module having a variable sweep. By rotating the sleeve, to account for changing pressure conditions, one can optimize the performance of the module.

The invention therefore has the primary object of providing a gas-separation membrane module having a variable sweep gas.

The invention has the further object of providing a gas-separation module in which the profile of introduction of sweep gas can be easily adjusted.

The invention has the further object of optimizing the efficiency of a gas-separation module.

The invention has the further object of providing a gas-separation module whose operation can be easily optimized even when the module is operated in varying pressure conditions.

The invention has the further object of providing an optimized gas-separation module for use in inerting of fuel tanks of aircraft.

The invention has the further object of providing a method of operating a gas-separation module in an efficient manner.

The reader skilled in the art will recognize other objects and advantages of the present invention, from a reading of the following brief description of the drawings, the detailed description of the invention, and the appended claims.

DETAILED DESCRIPTION OF THE INVENTION

The present invention is an optimized bore-side fed module that allows for a controlled air sweep on the low pressure shell side of the module. The invention enhances the performance of the module, as measured by increased enriched nitrogen product flow, and lower high-pressure feed air requirements.

The present invention provides a module in which the sweep gas can be controlled, both with regard to the location(s) in the module where the sweep gas is released, and with regard to the amount of sweep gas introduced at each location.

The invention is particularly useful for inerting of fuel tanks of aircraft. The latter application is favorable because the feed air pressure and feed/product pressure ratio are relatively low, and because the acceptable level of oxygen in the inert gas stream is relatively high, up to about 12%. It has been found that, with 12% oxygen, an explosion is highly unlikely.

In this application, the module operates with feed air taken from the bleed air system of the aircraft. The pressure of the feed air therefore changes with altitude. The shell-side pressure also changes with altitude since the permeate flow exits the module at ambient pressure.

A lower purity of nitrogen is needed during the climb and descent portions of the flight, and a higher purity is required during level cruise.

Figure 1:
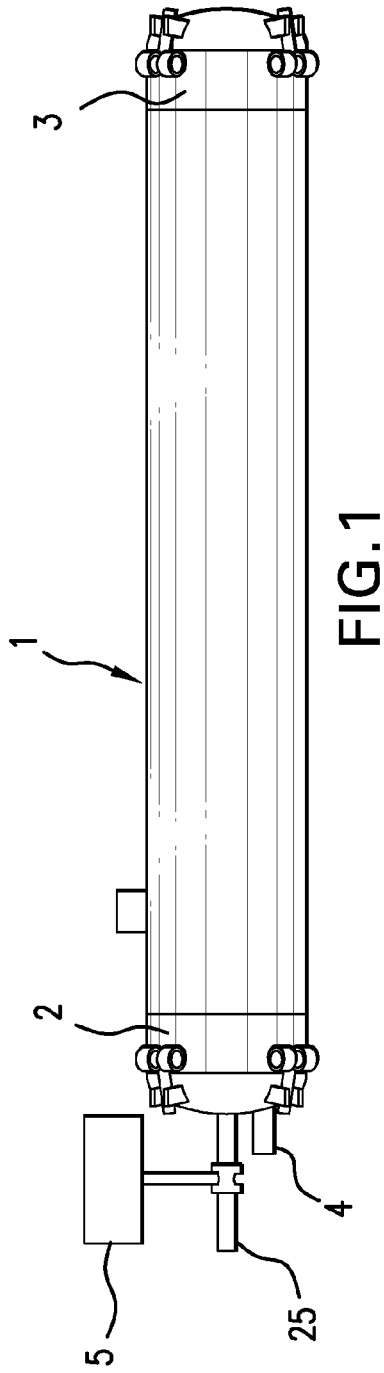
FIG. 1 provides a side elevational view of the gas-separation module of the present invention.

The gas-separation module of the present invention is shown, in an exterior, side elevational view, in FIG. 1. Module 1 comprises a generally cylindrical structure which houses a multiplicity of hollow fibers (not shown) formed of a gas-permeable membrane. The fibers are anchored by tube sheets, the external portions of which are identified by reference numerals 2 and 3, at the inlet and outlet ends of the module. Pressurized feed air is directed into conduit 4, which is in communication with the insides (the bore sides) of the fibers. It is this feed air which is separated into components. The fibers 40 are illustrated in the perspective and cross-sectional view of FIG. 4.

Figure 3:
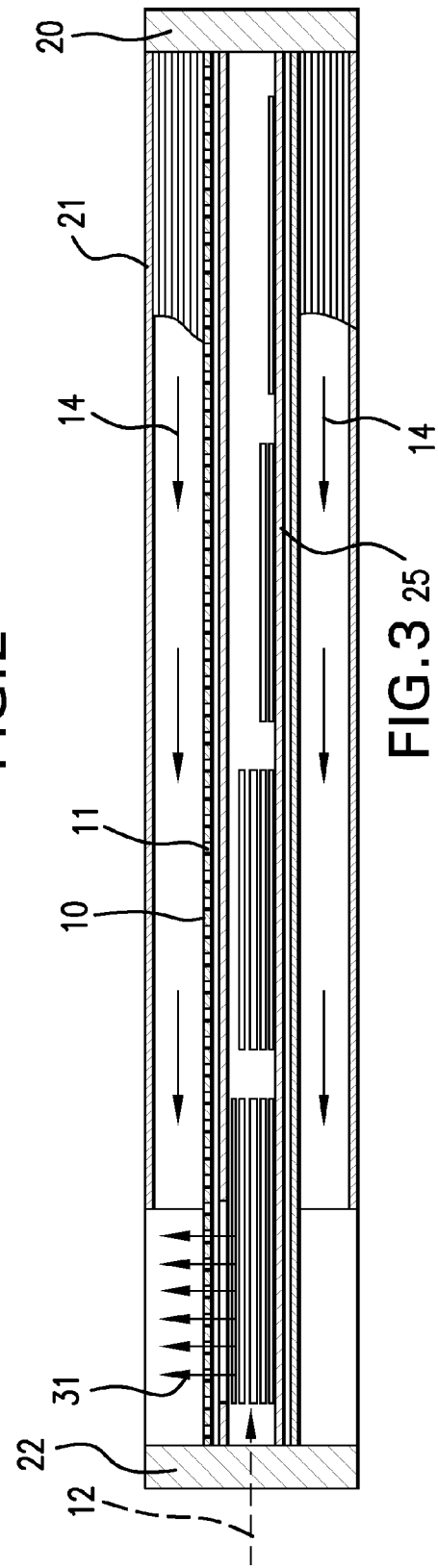
FIG. 3 provides a cross-sectional view of the module of the present invention, showing the relationship between the slotted sleeve and the perforated tube for distributing sweep gas.
Figure 4:
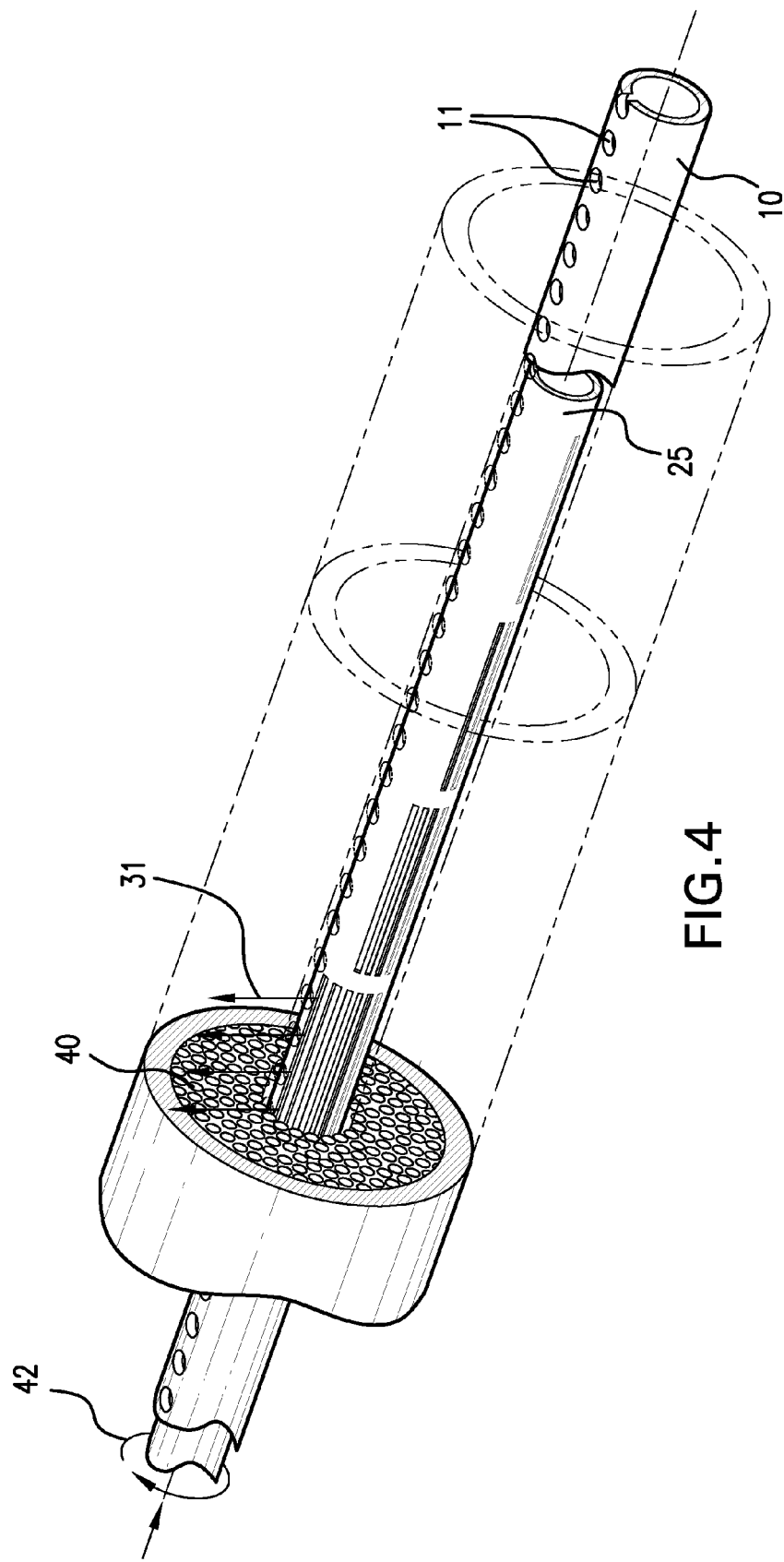
FIG. 4 provides a perspective view, partly in cross-section, and partly in phantom, illustrating the structure of the module of the present invention.

The sweep gas is introduced through perforated conduit 10, most clearly visible in FIGS. 3 and 4. The perforated conduit, which sits at or near the center of the module, substantially along its longitudinal axis, is fixed in position, and receives sweep gas, introduced from a source outside the module. The sweep gas exits the conduit 10 through holes 11.

In all of the figures, it is assumed that gas is introduced from the left. That is, in the drawings, the inlet end is the left-hand side, and the outlet end is the right-hand side. Arrow 12 indicates the flow of sweep gas introduced into the module. Arrows 14 represent the flow of permeate gas, combined with whatever sweep gas has passed through the perforations of conduit 10. The flow of permeate and sweep gas is counter-current to the flow of feed gas, and counter-current to the initial flow of sweep gas, due to the effects of tube sheet 20 and baffle 21. The tube sheet and baffle comprise barriers to the permeate and sweep gases, forcing the gas to turn around and flow to the left, as shown in the drawings. In the specific embodiment represented by FIG. 3, the baffle 21 extends along the majority of the length of the module.

Tube sheet 22 is located at the inlet end of the module. For clarity of illustration, FIG. 3 does not explicitly show the conduit for the feed air which is directed into the bores of the fibers.

Inside the perforated conduit 10, there is a slotted sleeve 25. The sleeve 25 has a generally cylindrical shape, and has a diameter which allows the sleeve to fit within the conduit 10, and to be rotatable within that conduit.

Figure 2:
FIG. 2 provides a side elevational view of a slotted sleeve which forms part of the module of the present invention.

The sleeve has a plurality of sets of elongated, parallel slots, each set of slots extending partly around the circumference of the sleeve at a given position. FIG. 2 shows the sleeve in isolation. The set of slots identified by reference numeral 26 may subtend an angle of about 60°. That is, the slots of this set may extend around one-sixth of the circumference of the sleeve. The set of slots identified by reference numeral 27 subtends a smaller angle than the set 26. In the example given, set 27 may subtend an angle of 45°. Similarly, set 28 subtends an angle of 30°, and set 29 subtends an angle of 15°. These angles are given by way of illustration, and are not intended to limit the invention. What is important is that the sleeve provide slots which extend along varying amounts of the circumference of the sleeve, at various positions along the length of the sleeve. In particular, the angle subtended by the set of slots preferably decreases as one moves from the inlet to the outlet end.

The sleeve 25, which is also shown in FIG. 1, is rotatable. In FIG. 1, rotating device 5 is shown connected to the sleeve. The rotating device could be a motor which engages the sleeve by a threaded connection, or other means for rotating the sleeve around its longitudinal axis.

Since the slots comprise elongated parallel openings, rotating the sleeve causes some of the holes 11 in the conduit 10 to become exposed, and thus to allow sweep gas to exit the conduit 10, as indicated by arrows 31. Due to the configuration of the sets of slots, the flow of sweep gas, out of the conduit 10, is controlled along the length of the module.

In particular, the slots are configured such that there is an angular position of the sleeve wherein sweep gas can exit the conduit 10 along the full length of the module. The sleeve can then be rotated slightly, such that the sweep gas exits the conduit at all locations except the extreme right-hand side (i.e. the location near the outlet end). The sleeve could be rotated further, cutting off more of the flow of sweep gas at positions near the outlet end, and so on. In an extreme position, the sleeve prevents sweep gas from exiting the conduit 10 at all locations except the vicinity of the inlet end. There could also be a position which cuts off the entire flow of sweep gas into the shell side of the module.

Thus, by rotating the sleeve around its axis, as indicated by arrow 42 in FIG. 4, one can control the sweep gas, and can determine the profile of sweep gas introduced into the module. That is, in general, for different angular positions of the sleeve, the sweep gas will be introduced into different portions of the module, with different flow volumes.

In the OBIGGS application described above, when low purity nitrogen is required, one adjusts the sleeve such that the entire length of the module receives the sweep gas. When higher purity nitrogen is desired, the sleeve is adjusted such that only the area near the inlet end receives sweep gas. In the latter case, providing a sweep gas to the entire length of the module would hinder the performance thereof.

The following Examples illustrate the benefits of the present invention. These Examples provide the results of a computer simulation showing the effect of the invention, as used in an aircraft during various phases of flight. In these Examples, the module is assumed to be a counter-current, bore-side fed structure, having a diameter of six inches and a length of 36 inches. The module is assumed to contain 500,000 fibers with an oxygen permeance of $15 \times 10^{10-5}$ $cm^3/cm^2$ cm hg sec, and an oxygen/nitrogen selectivity of 7.8. The fiber size was chosen to be 135×95 microns. The sweep stream was assumed to sweep uniformly those regions on the shell side of the module that had over 21% oxygen in the non-sweep simulations.

EXAMPLE 1

This Example simulates the take-off or landing phase, i.e. when the aircraft is at a low elevation. The pressure is assumed to be 45 psig. The simulation was run so as to generate a product (retentate) gas having oxygen concentrations of 12%, 7%, and 5%. This range is a typical one for inerting of fuel tanks. Even when the oxygen concentration is as high as 12%, an explosion of the fuel tank is unlikely.

The simulation was operated first without simulating any sweep stream. The results are as follows:

| Oxygen Concentration in Product Gas | Product Flow | Bleed Air Required |
|---|---|---|
| 12% | 378 scfh | 527 scfh |
| 7% | 187 scfh | 330 scfh |
| 5% | 141 scfh | 280 scfh |

The "bleed air" is the feed gas, which is taken from the high-pressure ambient air produced by the turbines. The feed gas is what is directed through the bores of the fibers, to produce an oxygen-depleted retentate gas. The table shows the required flow rates of bleed air to produce the indicated rates of product flow, for each concentration of oxygen in the product gas.

The simulation was then operated with the addition of a simulated sweep stream. It was assumed that the sweep stream contained 21% oxygen. In an optimal case, the sweep would be provided only in those locations where the oxygen concentration on the shell side exceeded 21%. In the actual operation of the simulation, the computer program simulated the introduction of sweep gas along specific fractions of the length of the module. Note that the expected concentration of oxygen, on the shell side of the module, can be calculated at each point, by methods known in the prior art, from a knowledge of the pressure and flow of the feed gas and of the properties of the membrane.

The results of the simulation, with the addition of the sweep gas, the sweep gas being non-pressurized ambient air, were as follows:

| Product Oxygen Conc. | Product Flow | Bleed Air Required | % of Shell Side Swept | Low Pressure Sweep Flow |
|---|---|---|---|---|
| 12% | 645 scfh | 820 scfh | 100% | 750 scfh |
| 7% | 245 scfh | 396 scfh | 75% | 750 scfh |
| 5% | 162 scfh | 305 scfh | 50% | 750 scfh |

The fourth column shows the percentage of the shell side which is swept. In the first case, the entire shell side is swept. In the second case, three-quarters of the module is swept, as measured from inlet end towards the outlet end. In the third case, half of the module is swept, also as measured from the inlet end and extending to the middle of the module.

The above table shows that the product flow increased in each case. The percentage increase was greatest in the case of 12% oxygen concentration (i.e. an increase of 71%, from 378 to 645 scfh), and smallest in the case of 5% concentration (an increase of 15%, from 141 to 162 scfh). The ratio of product air to bleed air required also increased from nearly 10% to 5.5% over the range of concentrations investigated.

EXAMPLE 2

This Example was designed to investigate a climb or descent, wherein an aircraft climbs from sea level to 35,000 feet, or descends from that altitude to sea level. For simplicity, an intermediate elevation of about 15,000 feet was chosen, where the bleed air pressure is assumed to be 53 psia and the permeate exits the module at about 8.5 psia.

The following tables show the results of the simulation. The module was assumed to be the same as in Example 1.

The following table shows the product flow and bleed air requirement for a module in which there is no sweep gas:

| Oxygen Concentration in Product Gas | Product Flow | Bleed Air Required |
|---|---|---|
| 12% | 439 scfh | 589 scfh |
| 7% | 217 scfh | 359 scfh |
| 5% | 163 scfh | 300 scfh |

The following table shows the product flow and bleed air requirements where the module is swept with low-pressure, ambient air (21% oxygen).

| Product Oxygen Conc. | Product Flow | Bleed Air Required | % of Shell Side Swept | Low Pressure Sweep Flow |
|---|---|---|---|---|
| 12% | 677 scfh | 850 scfh | 100% | 750 scfh |
| 7% | 288 scfh | 440 scfh | 100% | 750 scfh |
| 5% | 187 scfh | 328 scfh | 50% | 750 scfh |

In this simulation, for the first two cases, the entire shell side of the module was swept. In the third case (having a product oxygen concentration of 5%), only one-half of the shell side was swept. In the last case, the sweep gas was introduced from the inlet end towards the outlet end.

The tables show increased product flow when the shell side of the module is swept.

EXAMPLE 3

This Example investigates the case of high-altitude cruise. The aircraft is assumed to be at about 35,000 feet. The bleed air pressure is assumed to have dropped to about 45 psia, and the permeate will exit the module at about 3 psia. The module may be operated at fairly low oxygen concentration, less than about 7%, during this portion of the flight, so as to inert the fuel tanks sufficiently to compensate for an influx of ambient air (21% oxygen) when the aircraft begins to descend. The details of the module are the same as in the previous Examples.

The following table shows the product flow and bleed air requirement for a module in which there is no sweep gas:

| Oxygen Concentration in Product Gas | Product Flow | Bleed Air Required |
|---|---|---|
| 12% | 575 scfh | 730 scfh |
| 7% | 287 scfh | 432 scfh |
| 5% | 216 scfh | 356 scfh |
| 2% | 126 scfh | 256 scfh |

The following table shows the product flow and bleed air requirements where the module is swept with low-pressure, ambient air (21% oxygen).

| Product Oxygen Conc. | Product Flow | Bleed Air Required | % of Shell Side Swept | Low Pressure Sweep Flow |
|---|---|---|---|---|
| 12% | 705 scfh | 875 scfh | 100% | 750 scfh |
| 7% | 340 scfh | 494 scfh | 100% | 750 scfh |
| 5% | 244 scfh | 392 scfh | 100% | 750 scfh |
| 2% | 132 scfh | 264 scfh | 50% | 750 scfh |

The ratio of feed air pressure to ambient air pressure is highest at this stage, which minimizes the benefits of sweeping with air, but still the addition of the sweep gas produces increases in product flow of 23% to 5%.

The invention can be modified in various ways which will be apparent to those skilled in the art. For example, the exact configuration of slots in the sleeve can be varied. In theory, the angles subtended by the slots need not be monotonically decreasing, and entirely different profiles could be devised instead, to satisfy other needs. Such modifications should be considered within the spirit and scope of the following claims.

What is claimed is:

1. In a gas-separation module, the module including a plurality of hollow fibers made of a material capable of separating components of a feed gas, the fibers defining a bore side and a shell side, the module having a length, the module including a conduit for the introduction of a sweep gas into the shell side of the module, the improvement comprising means for introducing the sweep gas at selected positions along the length of the module, wherein the introducing means comprises means for varying an amount of sweep gas introduced at different positions alone the length of the module, wherein the conduit includes perforations through which the sweep gas can flow, and wherein the introducing means comprises a sleeve having a plurality of slots, the sleeve being positioned within the conduit.

2. The improvement of claim 1, wherein the sleeve is rotatable within the conduit, wherein rotation of the sleeve selectively opens and closes a path for gas flow through the perforations in the conduit.

3. The improvement of claim 2, wherein the sleeve has a plurality of sets of slots, wherein each set comprises slots subtending an angle which varies from one set to another.

4. The improvement of claim 3, wherein the module defines an inlet end and an outlet end, wherein the sleeve has four sets of slots, the sets of slots being disposed along the sleeve from the inlet end to the outlet end, and wherein the sets of slots subtend smaller angles towards the outlet end and larger angles towards the inlet end.

5. A gas-separation module, comprising:

a) a plurality of hollow fibers made of a material capable of separating components of a gas, the fibers being disposed between tube sheets located at an inlet end and an outlet end of the module, the fibers having a bore side and a shell side, b) a perforated conduit for introducing a sweep gas to the shell side of the fibers, and c) means for controlling longitudinal positions at which the sweep gas is introduced, wherein the controlling means also controls an amount of sweep gas introduced at different longitudinal positions alone the module, wherein the controlling means comprises a sleeve disposed within the perforated conduit, the sleeve comprising means for selectively blocking and unblocking selected perforations of the conduit.

6. The gas-separation module of claim 5, wherein the sleeve is rotatable within the conduit, and wherein the blocking and unblocking means comprises a plurality of slots formed in the sleeve.

7. The gas-separation module of claim 6, wherein the sleeve includes a plurality of sets of slots, the sets of slots being disposed along a length of the module, from the inlet end and extending towards the outlet end.

8. The gas-separation module of claim 7, wherein a number of slots formed in the sleeve is greater towards the inlet end, and is less towards the outlet end.

9. The gas-separation module of claim 8, wherein the sets of slots subtend progressively smaller angles as one moves from the inlet end towards the outlet end of the module.

10. The gas-separation module of claim 5, further comprising means for rotating the sleeve.

11. A method of operating a gas-separation membrane module, the module including a plurality of hollow fibers capable of separating components of a gas, the fibers defining a bore side and a shell side, the module including means for introducing a sweep gas into the shell side, the module having a length, the method comprising introducing a varying amount of sweep gas at a plurality of positions along the length of the module, wherein the introducing means comprises a perforated conduit, and wherein the introducing step comprises passing the sweep gas through a slotted sleeve disposed in a vicinity of the conduit, wherein portions of the slotted sleeve block and unblock perforations in the conduit.

12. The method of claim 11, further comprising rotating the slotted sleeve so as to change a profile of introduction of sweep gas into the module.

13. The method of claim 11, wherein the module has an inlet end and an outlet end, and wherein the method further comprises introducing more sweep gas near the inlet end than near the outlet end.

14. The method of claim 13, wherein the method comprises introducing a decreasing amount of sweep gas into the module, as one proceeds from the inlet end to the outlet end.

* * * * *